US011871175B2

(12) United States Patent
Peang

(10) Patent No.: US 11,871,175 B2
(45) Date of Patent: *Jan. 9, 2024

(54) EARPIECE COVER

(71) Applicant: Jini Peang, Brooklyn, NY (US)

(72) Inventor: Jini Peang, Brooklyn, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/063,748

(22) Filed: Dec. 9, 2022

(65) Prior Publication Data

US 2023/0319455 A1 Oct. 5, 2023

Related U.S. Application Data

(63) Continuation of application No. 17/657,239, filed on Mar. 30, 2022, now Pat. No. 11,533,556.

(51) Int. Cl.
*H04R 1/10* (2006.01)

(52) U.S. Cl.
CPC ......... *H04R 1/1091* (2013.01); *H04R 1/1016* (2013.01)

(58) Field of Classification Search
CPC ...... H04R 1/2807; H04R 1/20; H04R 1/1016; H04R 1/10; H04R 1/023; H04R 1/2823; H04R 1/2811; H04R 1/1041; H04R 1/1075; H04R 1/1066; H04R 1/105
USPC ......................... 381/370–371, 322, 380–382
See application file for complete search history.

(56) References Cited

U.S. PATENT DOCUMENTS 11,533,556 B1 * 12/2022 Peang .................. H04R 1/1016
2013/0177193 A1 * 7/2013 Orzel .................. H04R 1/1033
264/250

* cited by examiner

*Primary Examiner* — Carolyn R Edwards
*Assistant Examiner* — Julie X Dang
(74) *Attorney, Agent, or Firm* — Tatonetti IP

(57) ABSTRACT

An earbud cover is implemented that secures to an earbud and protects at least the earbud's exterior surface from external damage. The earbud cover includes an upper body portion that conforms to the shape of the earbud's bulky body, a mid-section that conforms to the shape of the earbud's thinner body, and a bottom portion underneath a bottom surface of the earbud. While the upper body portion, mid-section, and bottom portion have been used to describe the earbud, other characterizations of the earbud's design are also possible. The earbud includes a cutout/opening corresponding to the earbud's I/O interface, such as its speaker or microphone. While a single cutout/opening is shown in the pictures, multiple openings may be utilized depending on the specific earbud. The bottom portion of the earbud also includes a hole that may be used to carry around the covers more easily, such as on a keychain.

12 Claims, 10 Drawing Sheets

EARPIECE COVER

This Non-Provisional patent application is a Continuation application that claims the benefit of and priority to U.S. patent application Ser. No. 17/657,239, filed Mar. 30, 2022, entitled "Earpiece Cover," the entire contents of which is hereby incorporated herein by reference.

BACKGROUND

Earbuds have become a common item among people. The cost to purchase a pair of earbuds continues to rise with technological advances, such as wireless capabilities, shrinking size, and enhanced high fidelity (Hi-Fi). Dropping such devices or otherwise exposing them to external elements can result in aesthetic, structural, or functional damage, causing worry among users when the earbuds are in use.

SUMMARY

An earbud cover is implemented that secures to an earbud and protects at least the earbud's exterior surface from external damage. The earbud cover includes an upper body portion that conforms to the shape of the earbud's bulky body, a mid-section that conforms to the shape of the earbud's thinner body, and a bottom portion underneath a bottom surface of the earbud. While the upper body portion, mid-section, and bottom portion have been used to describe the earbud, other characterizations of the earbud's design are also possible.

The earbud includes a cutout/opening corresponding to its I/O (Input/Output) interface, such as its speaker or microphone. While a single cutout/opening is shown in the pictures, multiple openings may be utilized depending on the specific earbud. The bottom portion of the earbud also includes a hole that may be used to carry around the covers more easily. For example, the bottom hole may be used to attach the cover to a keychain, so the user conveniently always has the covers with them.

The cover may be comprised of one or more materials which can vary depending on the implementation. For example, the covers may be comprised of silicone, plastic, metal, or another suitable polymer. While the cover protects the earbud, it may also be decorated with some aesthetic design to enhance the earbud's conventional style.

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It will be appreciated that the above-described subject matter may be implemented as a computer-controlled apparatus, a computer process, a computing system, or as an article of manufacture such as one or more computer-readable storage media. These and various other features will be apparent from reading the following Detailed Description and reviewing the associated drawings.

BRIEF DESCRIPTION OF THE DRAWINGS

Like reference numerals indicate like elements in the drawings. Elements are not drawn to scale unless otherwise indicated.

DETAILED DESCRIPTION

Figure 1:
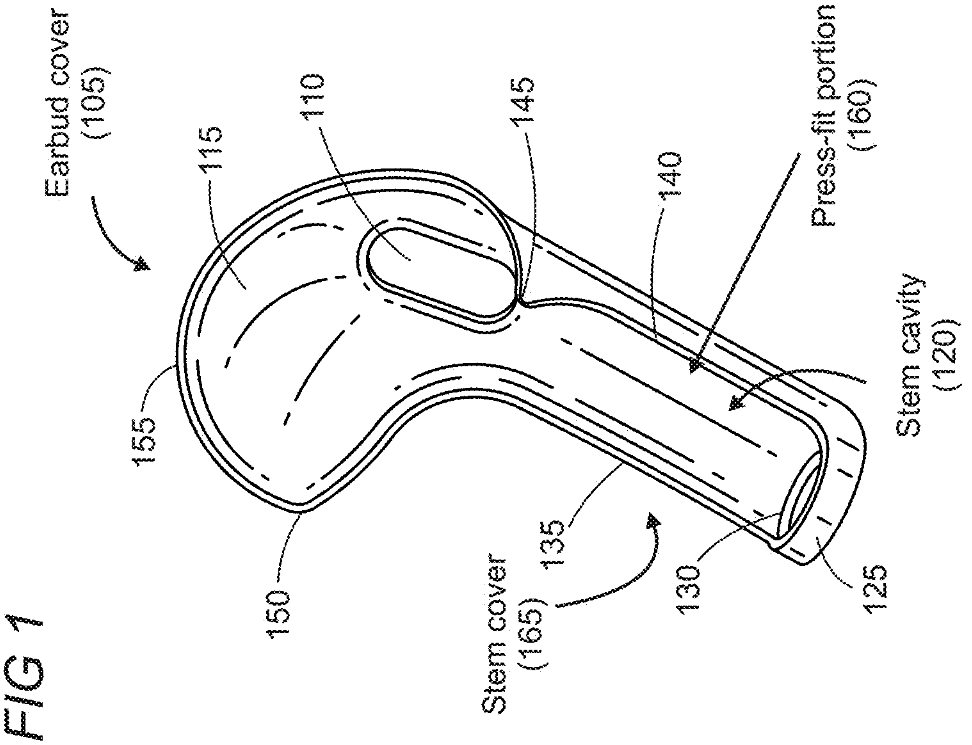
FIG. 1 shows an illustrative representation of an interior portion of an earbud cover.

FIG. 1 shows an illustrative representation in which an interior portion of an earbud cover 105 is configured with a press-fit portion 160 that snaps onto an earbud's exterior side. Although not shown in FIG. 1, the earbud is depicted in FIGS. 5-10 and discussed in reference to those drawings. The earbud cover has a cover head 155 adapted to cover an earbud's head, and a stem cover 165 adapted to receive the earbud's stem. The interior portion forms a concave shape to enable receipt of the earbud's body. The cover head 155 has an upper cover end 150 and a lower cover end 145, substantially between which is the earbud's head that rests against or adjacent to the cover head's interior 115. The cover head's interior has an opening 110 to expose the earbud's microphone or speaker so that auditory sounds between the user and microphone or speaker are unfettered.

The stem cover 165 includes a stem cavity 120, which receives the earbud's stem. The earbud's stem is press-fitted between the stem cover's left end 135 and right end 140, forming the press-fit portion 160. The bottom of the stem rests against stem base 125, which includes a hole 130 that exposes a bottom portion of the earbud's stem. The hole may be used, for example, to attach a keychain to a pair of earbud covers 105 for easier portability.

Figure 2:
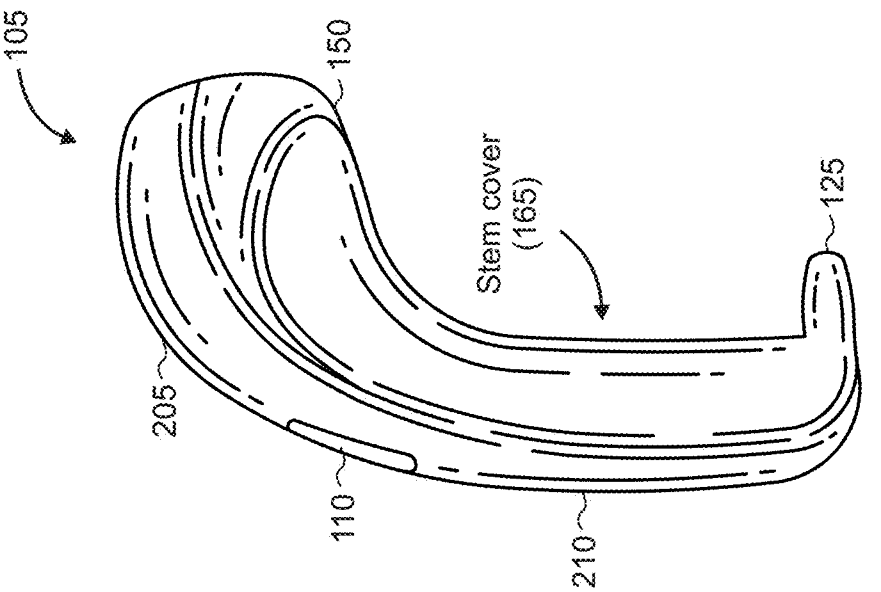
FIG. 2 shows an illustrative representation of an exterior portion of the earbud cover.

FIG. 2 shows an illustrative representation in which an exterior portion of the earbud cover 105 is shown. The earbud cover includes an exterior head portion 205 and an exterior stem portion 210—these exterior portions are exposed to the elements to protect the earbud to which the earbud cover is attached. The upper cover end 150 gradually inclines to form the stem cover 165 to create a seamless transition until the stem base's structure.

Figure 4:
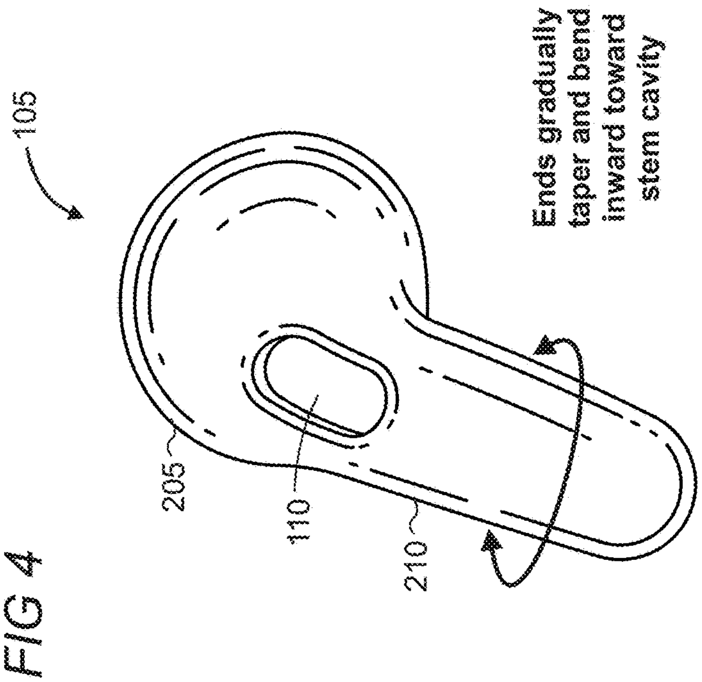
FIG. 4 shows an illustrative representation in which the stem ends gradually bend inward toward the stem cavity.
Figure 3:
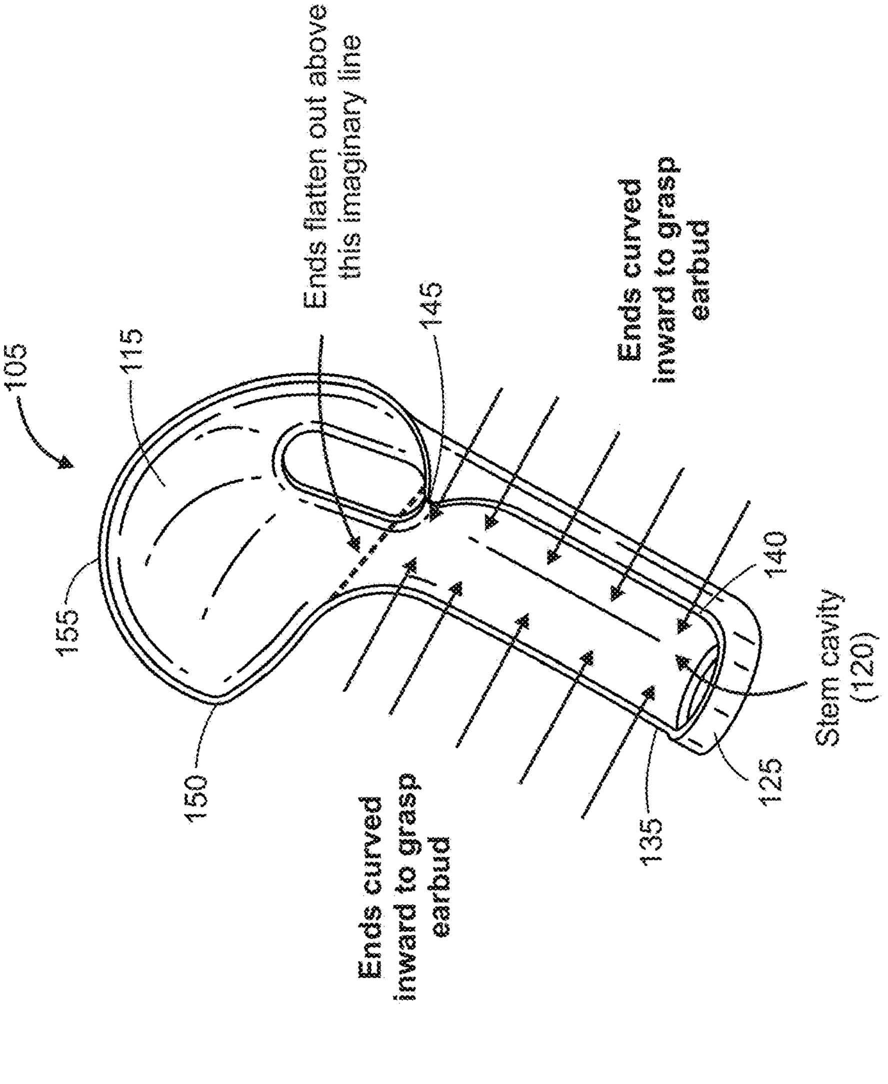
FIG. 3 shows an illustrative representation in which the stem ends curve inward toward the stem's cavity.

FIGS. 3 and 4 show illustrative representations in which the left and right stem ends 135, 140 are configured with inward-facing curved ends to grasp the earbud's stem and thereby secure the earbud in place. This inward curve toward the stem's cavity 120 occurs from or adjacent to the stem base 125 to the lower cover end 145 and toward the opposing side, as representatively shown by the imaginary dashed line. The structural configuration of the left and right stem ends 135, 140 causes the stem cover 165 to secure the earbud device in place.

Above the imaginary line shown in FIG. 3, the inward curve straightens out as the primary attachment mechanism is on the stem cover 120. The earbud head cover 155 provides protection to the earbud head, but the earbud itself is primarily secured in place via the stem cover 165 and its press-fit portion 160. In alternate configurations, the inward curve and press-fit mechanism may extend from the stem cover 120 to the head cover 155, or the press-fit portion may be present on the head cover and not on the stem cover. The press-fit placement may depend on the specific implementation and the scenario, such as, for example, different earbud device designs may require alternate press-fit locations, user experiences, etc.

Figure 5:
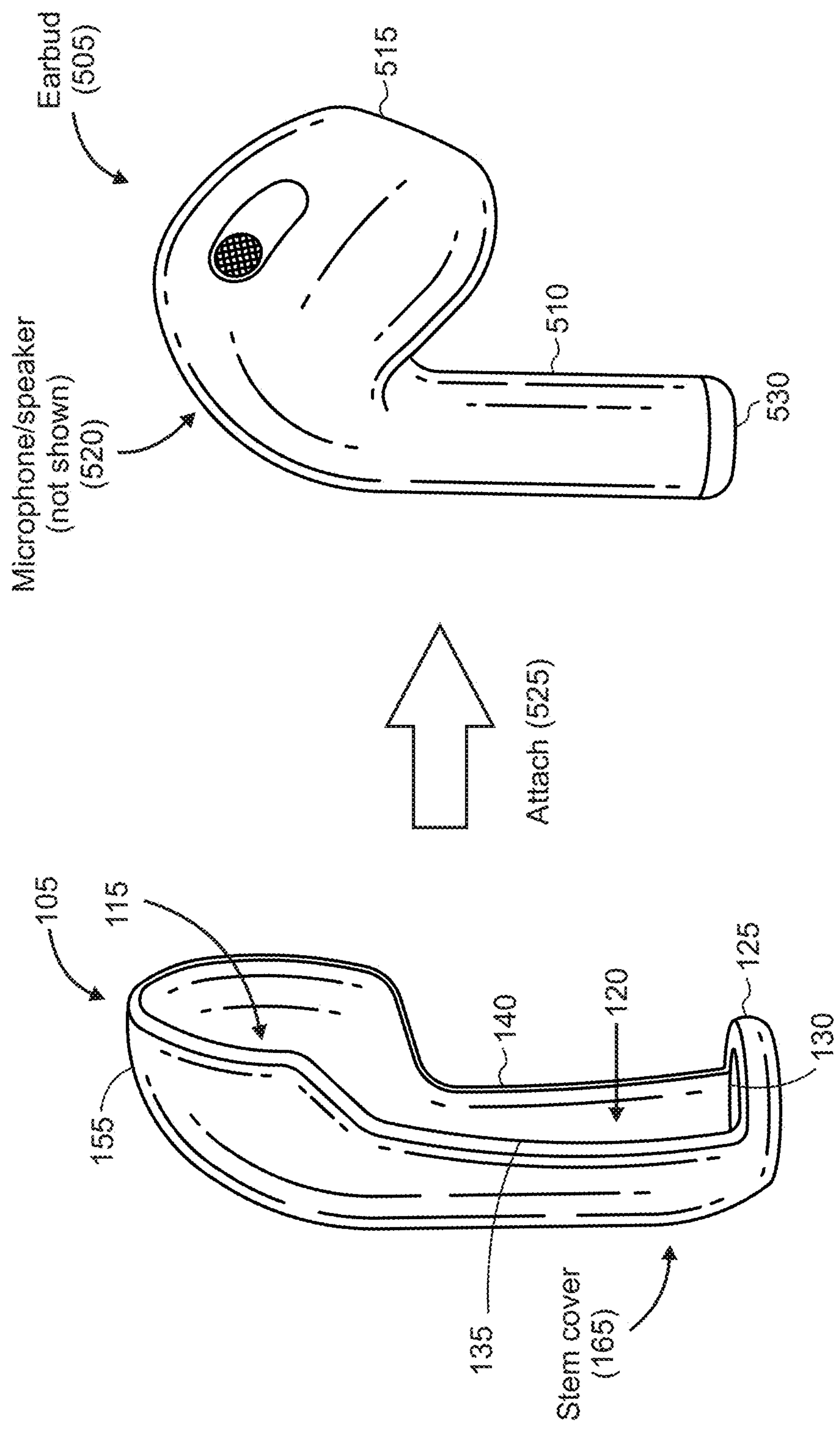
FIG. 5 shows an illustrative representation of the earbud cover aligned with an earbud.

FIG. 5 shows an illustrative representation in which the earbud cover 105 is aligned with an earbud device 505. Although a left-ear earbud device and earbud cover are shown, a symmetrical design may be used for the right-ear earbud device and cover. The rear side of the earbud engages with and attaches to the concave shape of the cover head's interior 115 and the stem cover 165, as representatively illustrated by numeral 525. Specifically, the rear of the earbud head 515 engages against or at least adjacent to the cover head's interior 115, and the earbud stem 510 engages with the stem cavity 120. The earbud's bottom 530 engages against the cover base 125 and rests at least partially against hole 130.

Figure 6A:
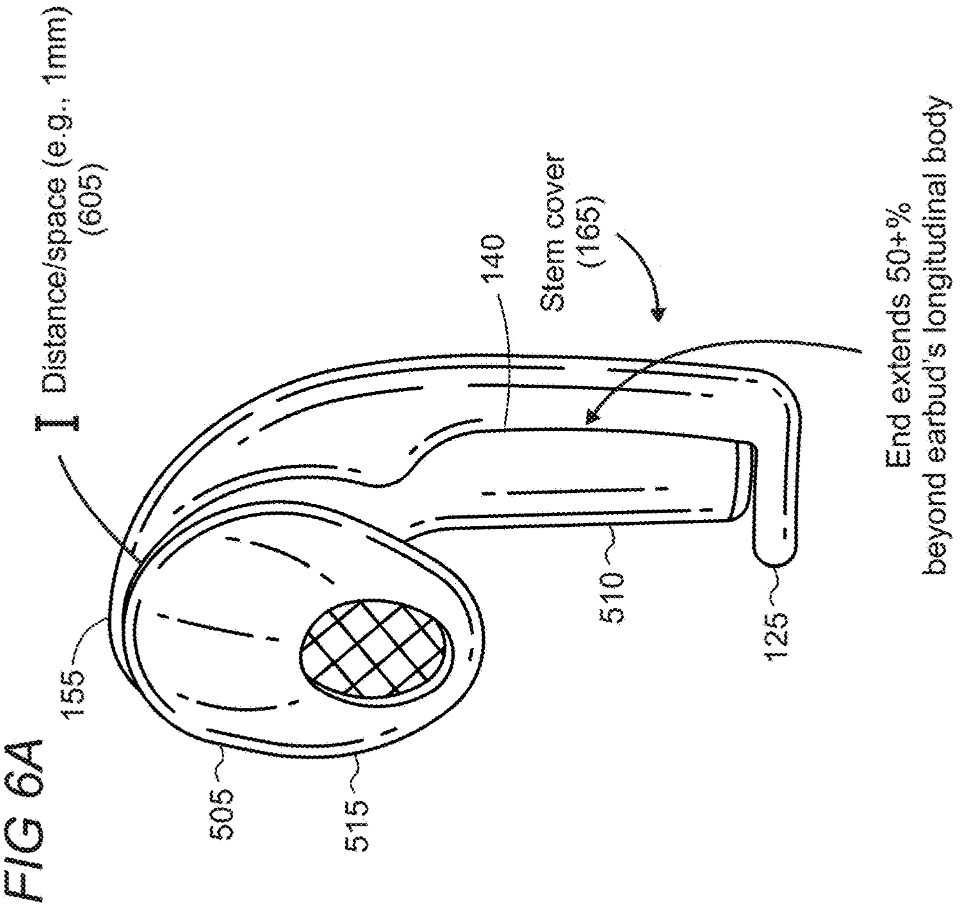
FIG. 6A shows an illustrative representation of the earbud cover's structural relationship with the earbud.
Figure 6B:
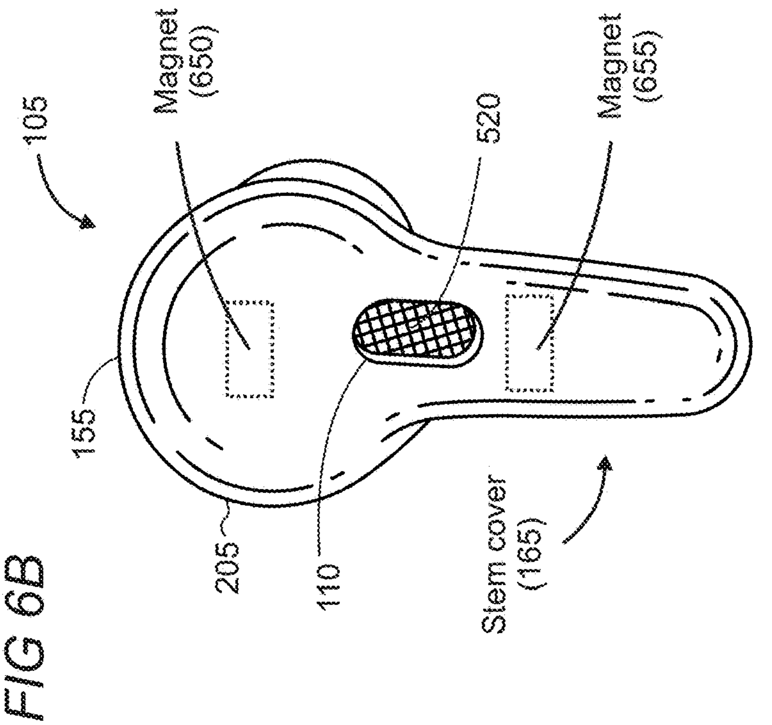
FIG. 6B shows an illustrative representation of the earbud's rear microphone/speaker exposed through the earbud cover's dedicated opening.

FIGS. 6A and 6B show illustrative representations in which the earbud device 505 is secured to the earbud cover 105. The stem cover 165, namely the right end 140 and the left end 135 (not shown in FIG. 6A), extends to cover at least 50% of the earbud device's stem 510 to sufficiently secure it against the earbud cover 105 and sufficiently protect the rear side of the earbud device. The head cover 155 can extend equidistant or beyond the length of the earbud's stem 510.

In the implementation shown, the head cover 155 extends approximately 10-30% of the earbud head's length, but in other implementations may extend up to 95% of the head's length or substantially cover the head. For example, the cover may extend far enough not to interfere with the earbud device's ability to secure to a user's ear, but alternatively, the earbud cover 105 may be configured to be inserted into a user's ear. For example, the earbud cover's head 155 may taper to a thinner material nearer to the end of the earbud head 515 to reduce interference with the earbud's securement to the user's ear—the earbud cover's silicone or rubber material may increase grip.

Unlike the press-fit portion 160 (FIG. 1) of the stem cover 165, the earbud cover 105 may be configured to provide a distance/space between the head cover 155 and the earbud head 515, as representatively shown by numeral 605. This space may be 1 mm (millimeter), such as 2 mm, 3 mm, etc. Such a space ensures that auditory sounds between the earbud and user are not interfered with. Alternatively, the head cover may be snugly fit against the body of the earbud head.

As shown in FIG. 6B, the earbud device's speaker/microphone 520 is exposed through the earbud cover's opening 110 to enable the free flow of auditory sounds to and from the earbud device 505 and the user. Furthermore, in some embodiments, the exterior head portion 205 may have one or more magnets 650, 655 attached thereto, such as via adhesive, or, in some implementations, the magnet may be positioned in a pocket inside the head cover 155. The pocket may be inside the head cover 155 or may be a third layer that protrudes from the head cover, inside which the magnet is positioned and completely, substantially, or partially sealed. The magnets may make a pair of earbud covers easier to manage by being connected together.

Figure 7:
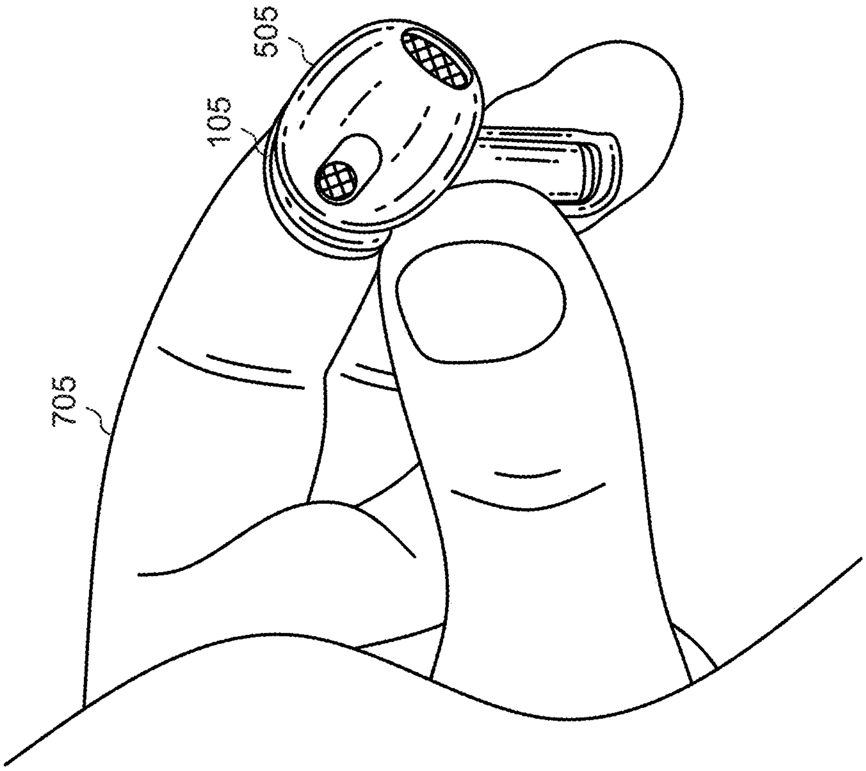
FIG. 7 shows an illustrative representation of a user gripping the earbud cover and earbud.
Figure 8:
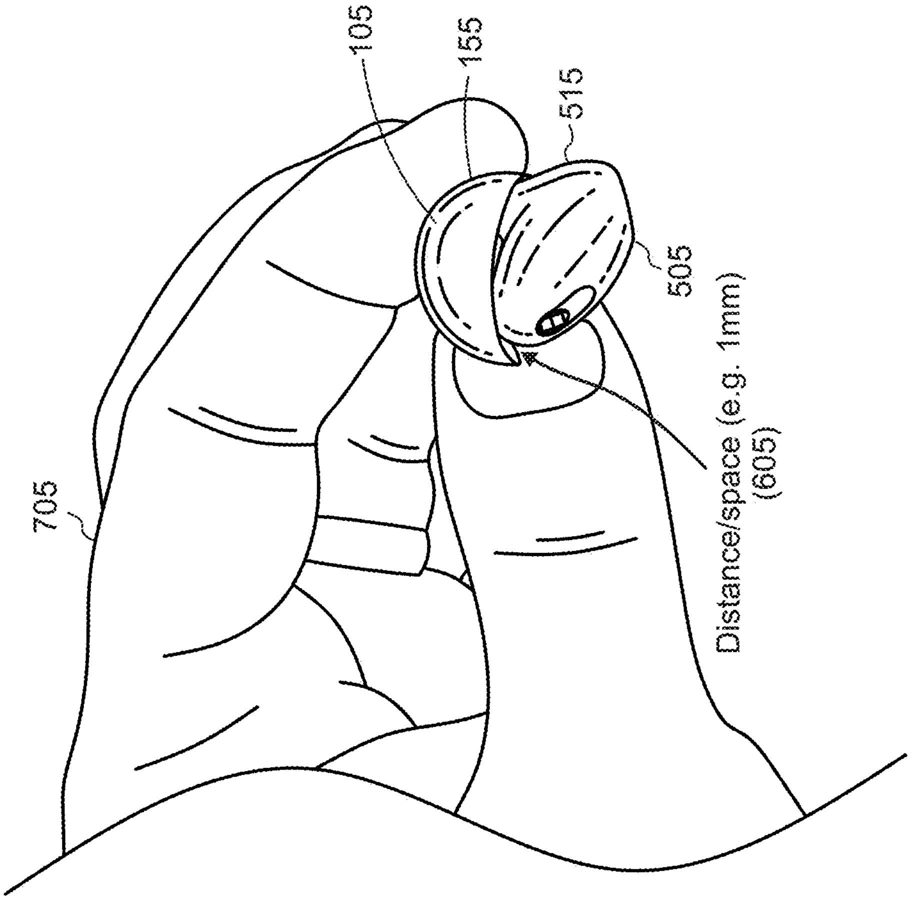
FIG. 8 shows an illustrative representation of the space between the earbud head and the head cover.
Figure 9:
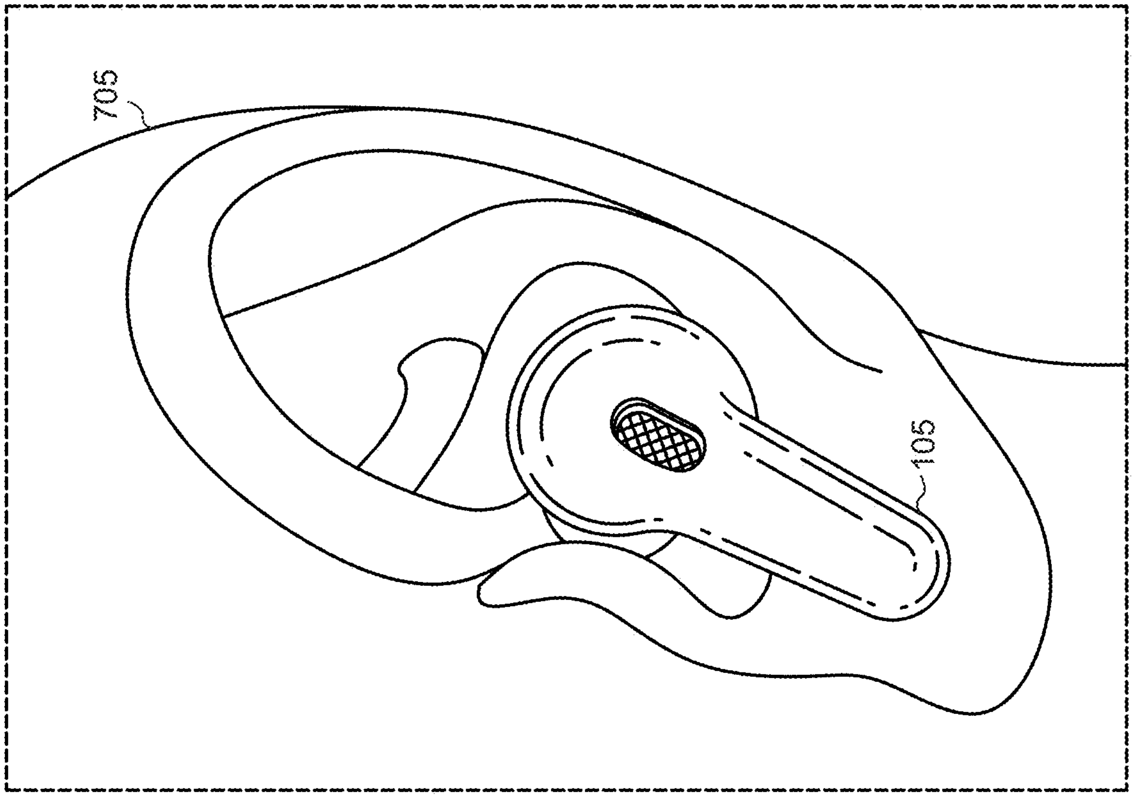
FIG. 9 shows an illustrative representation of the earbud cover exposed while the earbud is worn.

FIGS. 7 and 8 show illustrative representations in which a user 705 grasps the earbud cover 105 while attached to the earbud device 505. These figures further show the coverage of the earbud cover over the earbud device. FIG. 8 shows the distance/space 605 between the cover head 155 and the earbud device's head 515. FIG. 9 shows an illustrative representation in which the user 705 wears the earbud 505 inside their ear, and the earbud cover 105 is fully exposed. If the earbud falls out of the user's ear and onto the ground, the earbud cover provides substantial protection to a significant portion of the earbud's body, including its entire rear side, entire bottom side, and a portion of its top side.

Figure 10:
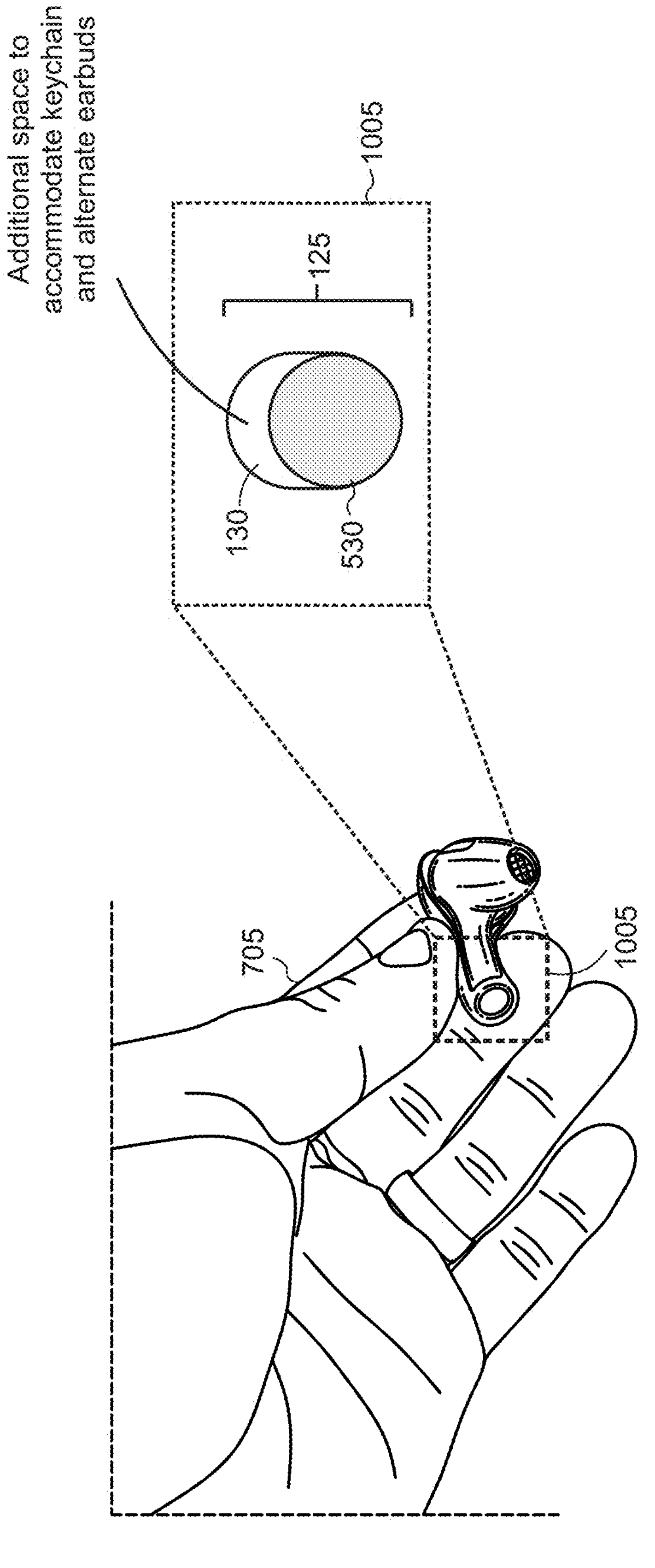
FIG. 10 shows an illustrative representation of the additional space provided by the earbud cover's base opening.

FIG. 10 shows an illustrative representation in which the stem base's hole 130 is larger than the earbud's bottom 530. The cutout region 1005 shows this distinction. The stem base's hole 130 may be larger than the earbud's bottom 530 to, for example, accommodate a keychain to which the earbud cover 105 can attach for easier portability. Despite this additional unoccupied space provided by the stem base, the earbud's bottom may still snugly fit and be tucked away into the stem base 125 and be secured in place via the press-fit portion 160 (FIGS. 1-4).

Figure 11:
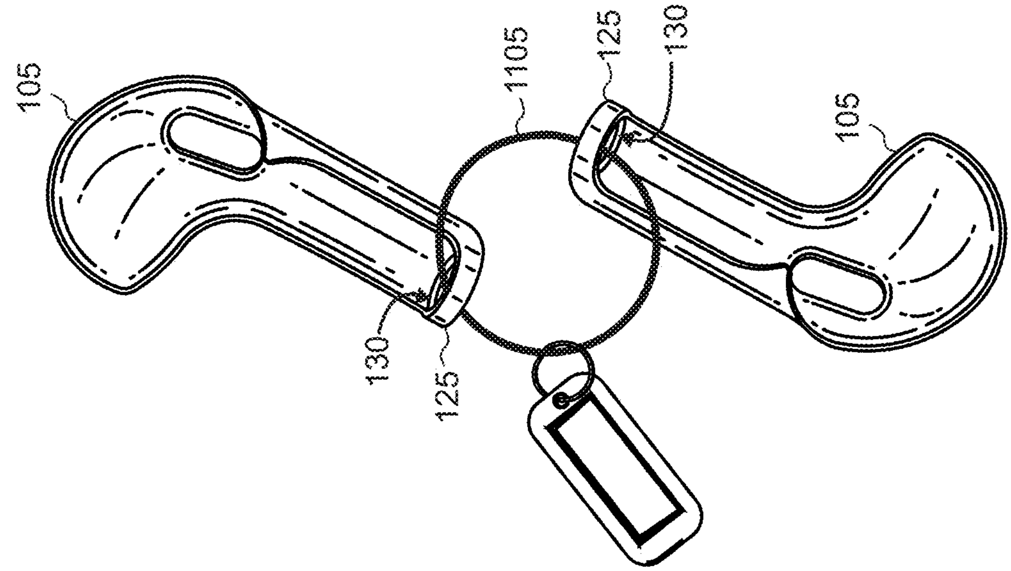
FIG. 11 shows an illustrative representation of a pair of earbud covers attached to a keychain.

FIG. 11 shows an illustrative representation in which a pair of earbud covers 105 are attached to a key ring 1105. The key ring is attached inside the earbud cover's respective holes 130 on the stem bases 125. Although no earbud is shown attached to the earbud covers, the additional space provided by the earbud holes (FIG. 10) can be used so that the user can keep the earbuds attached to the earbud covers while being attached to the key ring.

Figure 12:
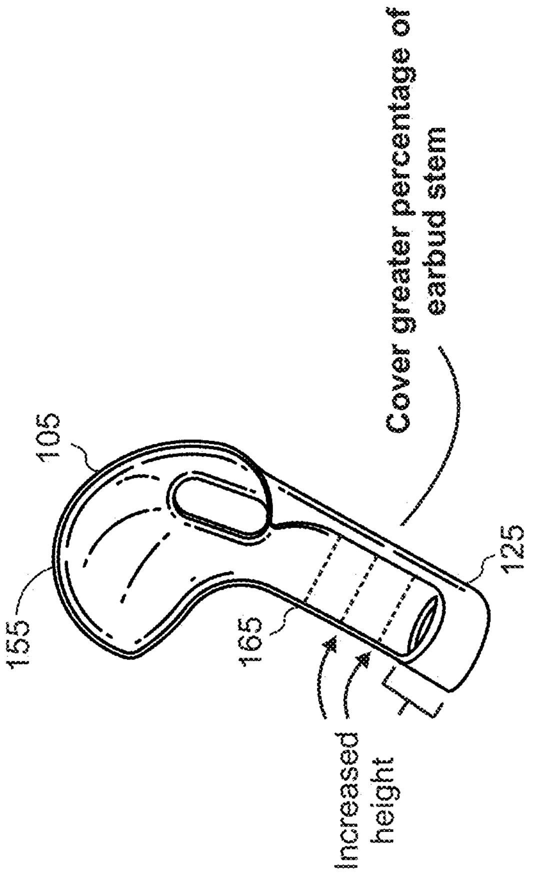
FIG. 12 shows an illustrative representation of the earbud cover in which the stem base can have varying heights.

FIG. 12 shows an illustrative representation in which the height of the stem base 125 can be modified in some configurations. In this regard, the stem base can extend higher up and thereby protect more of the earbud stem 510 (not shown). If the stem is higher, then the user may need to tilt the earbud stem into the stem cover 125 so that the earbud stem is initially inserted into the stem cover, and then, once inserted, the remainder of the earbud device is pressed against and parallel to the earbud cover 105.

Various exemplary embodiments are disclosed herein. In one embodiment, disclosed is an earpiece cover, comprising: a cover head having a concave shape that at least partially corresponds to the shape of an earbud device's head; a stem cover having a concave shape that at least partially corresponds to the shape of the earbud device's stem, wherein the stem cover is narrower than the cover head; a stem base that extends horizontally to the stem cover such that the stem base is substantially perpendicular to the stem cover, in which the stem base extends beyond an end of the stem cover's stem ends.

In another example, the stem base includes a hole to accommodate a bottom of an earbud device's stem. As another example, when an earbud device is attached to the earbud cover, the stem base's hole extends beyond the earbud device's stem. In another example, the stem base extends a distance up the stem cover such that, when the earbud is attached to the earbud cover, the stem base encircles the earbud device's stem. In another example, the stem ends include a left stem end and a right stem end, in which the left and right stem ends curve inward toward a stem cavity of the stem cover. As a further example, the inward curve of the left and right stem ends create a press-fit mechanism that grasps onto at least a portion of the earbud device's stem to secure the earbud device in place. In another example, the cover head includes a cover head interior, and wherein a distance is present between at least a portion of the cover head interior and the earbud device's head. As another example, the cover head includes an upper cover end and a lower cover end, at which points the stem cover and the cover head meet. In another example, the inward curve of the stem cover's left and right ends ceases curving inward at the upper cover end and the lower cover end. As another example, when an earbud device is attached to the earbud cover, the stem cover covers at least 50% of a longitudinal body of the earbud device's stem.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. An earpiece cover, comprising:

a cover head having a concave shape that at least partially corresponds to a shape of an earbud device's head;

a stem cover having a concave shape that at least partially corresponds to a shape of the earbud device's stem, wherein the stem cover is narrower than the cover head; and a stem base positioned at a bottom of the stem cover, in which the stem base is substantially perpendicular to the stem cover, in which a left stem end and a right stem end of the stem cover extend substantially perpendicularly upward from the stem base.

2. The earbud cover of claim 1, wherein the stem base substantially forms a circular shape and includes a hole.

3. The earbud cover of claim 2, wherein, when an earbud device is attached and press-fitted into the earbud cover, the stem base's hole is underneath a bottom of the earbud device's stem and the bottom of the earbud device's stem rests against the stem base.

4. The earbud cover of claim 1, wherein the stem base extends a distance up the stem cover such that, when the earbud is attached to the earbud cover, the stem base encircles the earbud device's stem.

5. The earbud cover of claim 2, further comprising a keychain that engages with the earbud cover's hole to enhance portability.

6. The earbud cover of claim 1, wherein the left and right stem ends curve inward toward a stem cavity of the stem cover.

7. The earbud cover of claim 6, wherein the inward curve of the left and right stem ends create a press-fit mechanism that grasps onto at least a portion of the earbud device's stem to secure the earbud device in place.

8. The earbud cover of claim 7, wherein the cover head includes a cover head interior, and wherein a distance is present between at least a portion of the cover head interior and the earbud device's head.

9. The earbud cover of claim 8, wherein the cover head includes an upper cover end and a lower cover end, at which points the stem cover and the cover head meet.

10. The earbud cover of claim 9, wherein the inward curve of the stem cover's left and right ends ceases curving inward at the upper cover end and the lower cover end.

11. The earbud cover of claim 8, wherein, when an earbud device is attached to the earbud cover, the stem cover covers at least 50% of a longitudinal body of the earbud device's stem.

12. The earbud cover of claim 1, further comprising a magnet positioned inside a portion of the earbud cover to enable connection to another earbud cover.

* * * * *